(12) United States Patent
Ji et al.

(10) Patent No.: US 12,136,370 B2
(45) Date of Patent: Nov. 5, 2024

(54) PIXEL SENSING CIRCUIT AND INTEGRATED CIRCUIT

(71) Applicant: LX Semicon Co., Ltd., Daejeon (KR)

(72) Inventors: Seung Hwan Ji, Daejeon (KR); Yong Jung Kwon, Daejeon (KR); Ho Sung Hong, Daejeon (KR); Jung Bae Yun, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/764,935

(22) PCT Filed: Sep. 28, 2020

(86) PCT No.: PCT/KR2020/013165
§ 371 (c)(1),
(2) Date: Mar. 29, 2022

(87) PCT Pub. No.: WO2021/066434
PCT Pub. Date: Apr. 8, 2021

(65) Prior Publication Data
US 2022/0366823 A1    Nov. 17, 2022

(30) Foreign Application Priority Data

Sep. 30, 2019    (KR) .................. 10-2019-0120603

(51) Int. Cl.
*G09G 3/00*       (2006.01)
*G09G 3/3233*    (2016.01)

(52) U.S. Cl.
CPC .......... *G09G 3/006* (2013.01); *G09G 3/3233* (2013.01); *G09G 2300/0833* (2013.01); *G09G 2330/12* (2013.01)

(58) Field of Classification Search
CPC ................. G09G 3/006; G09G 3/3233; G09G 2300/0833; G09G 2330/12
See application file for complete search history.

(56) References Cited

U.S. PATENT DOCUMENTS

| | | | |
|---|---|---|---|
| 9,183,772 B2* | 11/2015 | Tsuchi | ................ G09G 3/3688 |
| 2006/0214918 A1 | 9/2006 | Destura | |
| 2008/0231562 A1 | 9/2008 | Kwon | |
| 2011/0122119 A1 | 5/2011 | Bae | |
| 2016/0021722 A1 | 1/2016 | Soto | |

(Continued)

FOREIGN PATENT DOCUMENTS

| | | |
|---|---|---|
| CN | 101470139 A | 7/2009 |
| CN | 105321479 A | 2/2016 |

(Continued)

OTHER PUBLICATIONS

Chinese Office Action dated Aug. 15, 2023 issued in Patent Application No. 202080062819.4 (11 pages).

(Continued)

*Primary Examiner* — Kenneth B Lee, Jr.
(74) *Attorney, Agent, or Firm* — POLSINELLI PC

(57) ABSTRACT

The present disclosure relates to a pixel sensing circuit in which a test is performed only on selected specific channels among channels of the pixel sensing circuit and the total test time of the pixel sensing circuit and data throughput for the test may be reduced.

13 Claims, 12 Drawing Sheets

(56) References Cited

U.S. PATENT DOCUMENTS

| | | | |
|---|---|---|---|
| 2016/0240132 A1* | 8/2016 | Takahiro | ............... G09G 3/325 |
| 2018/0144689 A1 | 5/2018 | Hong et al. | |
| 2019/0285691 A1 | 9/2019 | Ryu | |
| 2020/0013333 A1* | 1/2020 | Hwang | ............... G09G 3/3275 |

FOREIGN PATENT DOCUMENTS

| | | |
|---|---|---|
| CN | 106097969 A | 11/2016 |
| CN | 107784973 A | 3/2018 |
| CN | 108090467 A | 5/2018 |
| CN | 108091299 A | 5/2018 |
| CN | 108122541 A | 6/2018 |
| CN | 109637408 A | 4/2019 |
| CN | 110070832 A | 7/2019 |
| KR | 10-0636502 B1 | 10/2006 |
| KR | 20140013146 A | 2/2014 |
| KR | 20160088972 A | 7/2016 |
| KR | 2016-0094129 A | 8/2016 |
| KR | 2018-0057752 A | 8/2016 |
| KR | 2017-0078932 A | 7/2017 |
| KR | 2017-0080935 A | 7/2017 |
| KR | 2018-0076467 A | 7/2018 |
| KR | 2018-0103271 A | 9/2018 |
| KR | 2019-0043372 A | 4/2019 |

OTHER PUBLICATIONS

Chinese Office Action dated Jan. 9, 2024 issued in Patent Application No. 202080062819.4 (14 pages).
Chinese Notice of Allowance dated Mar. 29, 2024 issued in Patent Application No. 202080062819.4 (6 pages).

\* cited by examiner

PIXEL SENSING CIRCUIT AND INTEGRATED CIRCUIT

CROSS-REFERENCE TO RELATED APPLICATION

This application is a national stage entry of PCT/KR2020/013165 filed Sep. 28 2020 which claims priority from Korean Patent Application No. 10-2019-0120603 filed on Sep. 30, 2019 in the Korean Intellectual Property Office, the disclosure of which is herein incorporated by reference in their entirety. In addition, this application claims priority in countries other than the Circuited States for the same reason, and disclosure of which is herein incorporated by reference in its entirety.

TECHNICAL FIELD

The present disclosure relates to a technique for testing a pixel sensing circuit.

BACKGROUND ART

A display device may include a source driver for driving pixels disposed on a panel.

A source driver determines a data voltage according to image data, and controls the brightness of each pixel by supplying the data voltage to the pixels.

Meanwhile, even if the same data voltage is supplied to the pixels, the brightness of each pixel may vary according to the characteristics of the pixel. For example, each pixel includes a driving transistor, and when a threshold voltage of the driving transistor is changed, the brightness of the pixel may be changed even if the same data voltage is supplied thereto. If the source driver does not consider the characteristic changes of the pixels, the driven pixels have an undesirable brightness, and deteriorated image quality. Smudges on a screen are an example of poor image quality.

In order to improve the poor image quality, the display device may include a pixel sensing circuit for sensing characteristics of the pixels.

The pixel sensing circuit may receive an analog signal for each pixel through a sensing line connected to each pixel. Then, the pixel sensing circuit converts the analog signal into pixel sensing data and transmits it to a timing controller, and the timing controller grasps the characteristics of each pixel through the pixel sensing data. In addition, the timing controller compensates the image data by reflecting the characteristics of each pixel, thereby improving the problem of image quality deterioration due to pixel deviation.

Meanwhile, the pixel sensing circuit may be tested in advance for pixel sensing. The test may relate to whether the pixel sensing circuit can properly perform pixel sensing. For example, if the pixel sensing circuit receives an analog signal, e.g., a current signal, and then outputs pixel sensing data, e.g., voltage data, within an error range, it can be determined that the pixel sensing circuit operates normally. If the pixel sensing circuit outputs pixel sensing data outside the error range, it may be determined that the pixel sensing circuit has a defect. The pixel sensing data output by the defective pixel sensing circuit needs to be further corrected.

The testing of the pixel sensing circuit may be performed by sequentially checking the channels inside the pixel sensing circuit one by one. The pixel sensing circuit includes a plurality of channels corresponding to a plurality of pixels existing in one line, and the channels may sense the respective pixels in a pixel sensing process. In the test process, an external reference current (an analog signal) is sequentially applied to each channel, and each channel may also sequentially sense the external reference current. However, the sequential testing of the pixel sensing circuit may consume a considerable amount of time. Since all channels are tested in the sequential test, the test time of the pixel sensing circuit may correspond to the product of the test time per channel and the number of the channels.

The above sequential test may be more inefficient in a case that testing only for some channels or a specific channel of the pixel sensing circuit is needed. This is because, in order to test some channels, the channels that are not needed to be tested, are also tested, which increases the time required for testing.

DETAILED DESCRIPTION OF THE INVENTION

Technical Problem

In view of the above, the present disclosure provides a technique for selecting a few specific channels among channels of a pixel sensing circuit and testing only the selected channels.

Further, the present disclosure provides a technique for selecting a channel required for testing a pixel sensing circuit by controlling supplying of a test current or driving of an amplifier.

Technical Solution

In accordance with one embodiment, there is provided an integrated circuit comprising: a pixel sensing circuit that senses characteristics of pixels disposed on a panel; and a channel selecting circuit that generates a channel selection signal, wherein the pixel sensing circuit comprises a plurality of channel circuits to be tested for a sensing, receives the channel selection signal to select at least one representative channel circuit among the plurality of channel circuits, and performs a test on the representative channel circuit.

In the integrated circuit, the representative channel circuit may receive an analog signal including a test current, convert the test current through the test, and output a digital signal including test data.

In the integrated circuit, the representative channel circuit may integrate the test current to generate an integrated voltage and convert the integrated voltage to generate the test data.

In the integrated circuit, the pixel sensing circuit may comprise a switching circuit that controls the supply of the test current, and the switching circuit may transmit the test current to the representative channel circuit and block the test current to the remaining channel circuits.

In the integrated circuit, the switching circuit may comprise a plurality of switches respectively connected to the plurality of channel circuits, and the plurality of switches may control the supply of the test current to the respective channel circuits through opening and closing.

In the integrated circuit, the channel selecting circuit may transmit the channel selection signal to the switching circuit to open or close each the plurality of switches.

In the integrated circuit, each of the plurality of channel circuits may comprise an amplifier and the channel selecting circuit may control driving of an amplifier to select a representative channel circuit.

In the integrated circuit, the channel selecting circuit may turn on an amplifier of a channel circuit in order to select the channel circuit as a representative channel circuit and turn off an amplifier of a channel circuit so as not to select the channel circuit.

In the integrated circuit, the channel circuit may receive the channel selection signal and control driving of the amplifier according to the channel selection signal.

In the integrated circuit, the representative channel circuit may be a channel circuit located at an edge among the plurality of channel circuits disposed in the pixel sensing circuit.

In the integrated circuit, the test current may be generated by a Power Management Integrated Circuit (PMIC) and supplied to the pixel sensing circuit.

In accordance with another embodiment, there is provided a pixel sensing circuit for sensing a characteristic of a pixel disposed on a panel, the pixel sensing circuit comprising: a first group comprising a plurality of first channel circuits having a first characteristic; and a second group comprising a plurality of second channel circuits having a second characteristic different from the first characteristic, wherein each of the first and second groups include at least one representative channel circuit selected for a test for a sensing of the pixel characteristic.

In the pixel sensing circuit, the plurality of first channel circuits may be arranged adjacent to each other in a first region, the plurality of second channel circuits may be arranged adjacent to each other in a second region spaced apart from the first region, a first representative channel circuit included in the first group may be positioned at an edge of the first region, and a second representative channel circuit included in the second group may be positioned at an edge of the second region.

In the pixel sensing circuit, the representative channel circuit may receive a test current and be tested by the test current, and the remaining channel circuits may not receive the test current and not be tested.

In the pixel sensing circuit, each of the plurality of first channel circuits and the plurality of second channel circuits may comprise an amplifier therein, and the representative channel circuit may be tested when its amplifier is turned on and the remaining channel circuits may not be tested when their amplifiers are turned off.

Effects of the Invention

As described above, according to the present embodiment, by testing only some channels of the pixel sensing circuit, the total test time of the pixel sensing circuit and the data processing amount for the test can be reduced.

Further, according to the present embodiment, by testing only some channels of the pixel sensing circuit, the same effect as when testing the entire pixel sensing circuit can be obtained.

In addition, according to the present embodiment, it is possible to selectively test only desired channels.

MODE FOR IMPLEMENTING THE INVENTION

Figure 1:
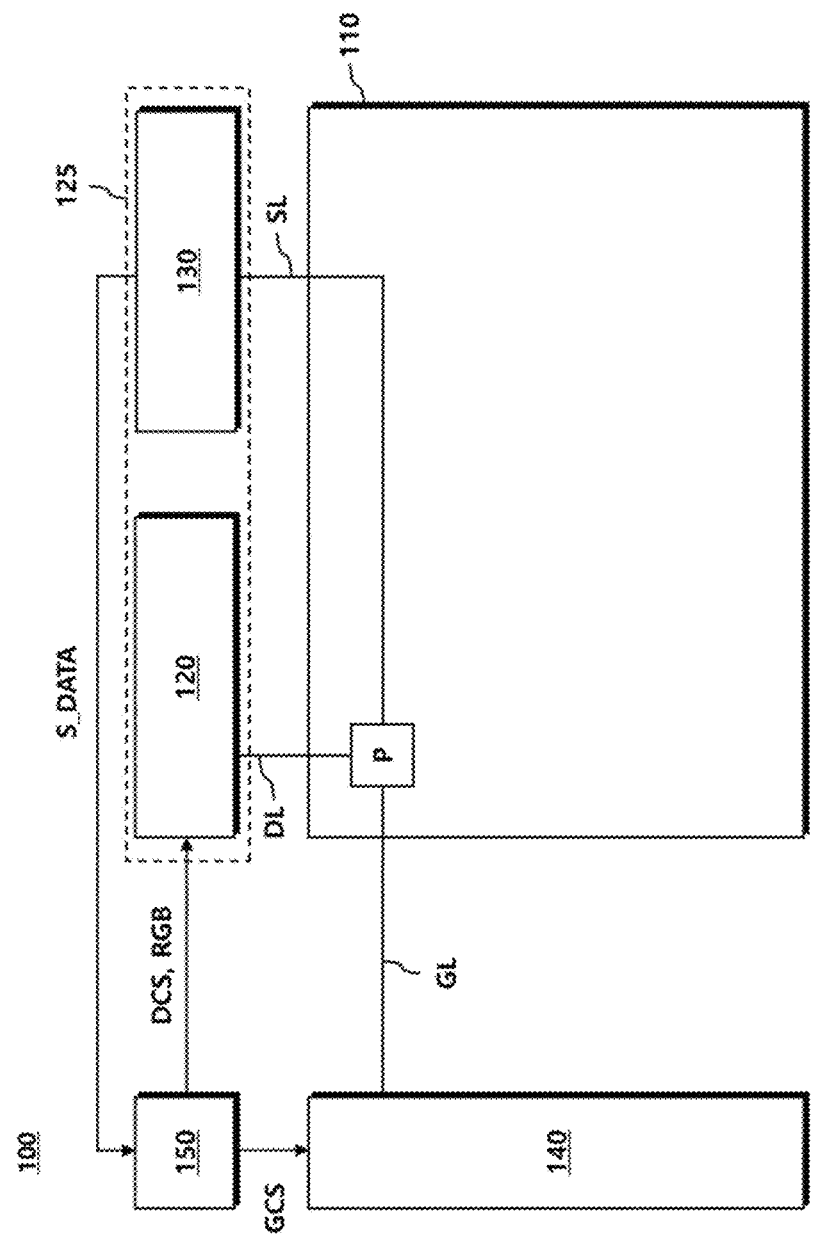
FIG. 1 is a block diagram of a display device according to one embodiment.

Hereinafter, some embodiments of the present disclosure will be described in detail with reference to exemplary drawings. With regard to the reference numerals of the components of the respective drawings, it should be noted that the same reference numerals are assigned to the same components even though they are shown in different drawings. In addition, in describing the present disclosure, a detailed description of a well-known configuration or function related to the present disclosure, which may obscure the subject matter of the present disclosure, will be omitted.

In addition, terms, such as "first", "second", "A", "B", "(a)", "(b)", or the like, may be used in describing the components of the present disclosure. These terms are intended only for distinguishing a corresponding component from other components, and the nature, order, or sequence of the corresponding component is not limited to the terms. In the case where a component is described as being "coupled", "combined", or "connected" to another component, it should be understood that the corresponding component may be directly coupled or connected to another component or that the corresponding component may also be "coupled", "combined", or "connected" to the component via another component provided therebetween.

FIG. 1 is a block diagram of a display device according to one embodiment.

Referring to FIG. 1, the display device 100 may include a panel 110 and panel driving circuits 120, 130, 140, and 150 for driving the panel 110.

A plurality of data lines DL, a plurality of gate lines GL, and a plurality of sensing lines SL may be disposed on the panel 110, and a plurality of pixels P may be disposed on the panel 110.

The circuits 120, 130, 140, and 150 for driving at least one component included in the panel 110 may be referred to as the panel driving circuit. For example, a data driving circuit 120, a pixel sensing circuit 130, a gate driving circuit 140, and a data processing circuit 150 may be referred to as the panel driving circuit.

Each of the circuits 120, 130, 140, and 150 described above may be referred to as the panel driving circuit, and all or some of them may be referred to as the panel driving circuit.

In the panel driving circuit, the gate driving circuit 140 may supply a scan signal of a turn-on voltage or a turn-off voltage to the gate line GL. When the scan signal of the turn-on voltage is supplied to the pixel P, the pixel P is connected to the data line DL. When the scan signal of the turn-off voltage is supplied to the pixel P, the pixel P and the data line DL is disconnected.

In the panel driving circuit, the data driving circuit 120 supplies a data voltage to the data line DL. The data voltage supplied to the data line DL is transferred to the pixel P connected to the data line DL according to the scan signal.

In the panel driving circuit, the pixel sensing circuit 130 receives an analog signal (e.g., voltage, current, etc.) formed in each pixel P. The pixel sensing circuit 130 may be connected to each pixel P according to the scan signal, or may be connected to each pixel P according to a separate sensing signal. In this case, the separate sensing signal may be generated by the gate driving circuit 140.

In the panel driving circuit, the data processing circuit 150 may supply various control signals to the gate driving circuit 140 and the data driving circuit 120. The data processing circuit 150 may generate a gate control signal GCS for starting a scan according to timing implemented in each frame and transmit it to the gate driving circuit 140. In addition, the data processing circuit 150 may output image data RGB, which is converted from externally input image data according to a data signal format used in the data driving circuit 120, to the data driving circuit 120. Further, the data processing circuit 150 may transmit a data control signal DCS for controlling the data driving circuit 120 to supply a data voltage to each pixel P according to each timing.

The data processing circuit 150 may compensate and transmit the image data RGB according to the characteristics of the pixel P. In this case, the data processing circuit 150 may receive a sensing data S_DATA from the pixel sensing circuit 130. The sensing data S_DATA may include a measurement value for the characteristic of the pixel P.

Meanwhile, the data driving circuit 120 may be referred to as a source driver. And, the gate driving circuit 140 may be referred to as a gate driver. Further, the data processing circuit 150 may be referred to as a timing controller. The data driving circuit 120 and the pixel sensing circuit 130 are included in one integrated circuit 125, which may be referred to as a source driver IC (Integrated Circuit). In addition, the data driving circuit 120, the pixel sensing circuit 130, and the data processing circuit 150 may be included in one integrated circuit, which may be referred to as an integrated IC. Although the present embodiment is not limited to the above terms, descriptions of some commonly known components of the source driver, the gate driver, the timing controller, and the like will be omitted in the descriptions of the following embodiments. Therefore, in understanding the embodiment, it should be considered that the commonly known components are omitted.

Meanwhile, the panel 110 may be an organic light emitting display panel. In this case, the pixels P disposed in the panel 110 may include an organic light emitting diode (OLED) and one or more transistors. The characteristics of the organic light emitting diode OLED and the transistor included in each pixel P may change over time or depending on a surrounding environment. The pixel sensing circuit 130 according to one embodiment may sense characteristics of these components included in each pixel P and transmit them to the data processing circuit 150.

Figure 2:
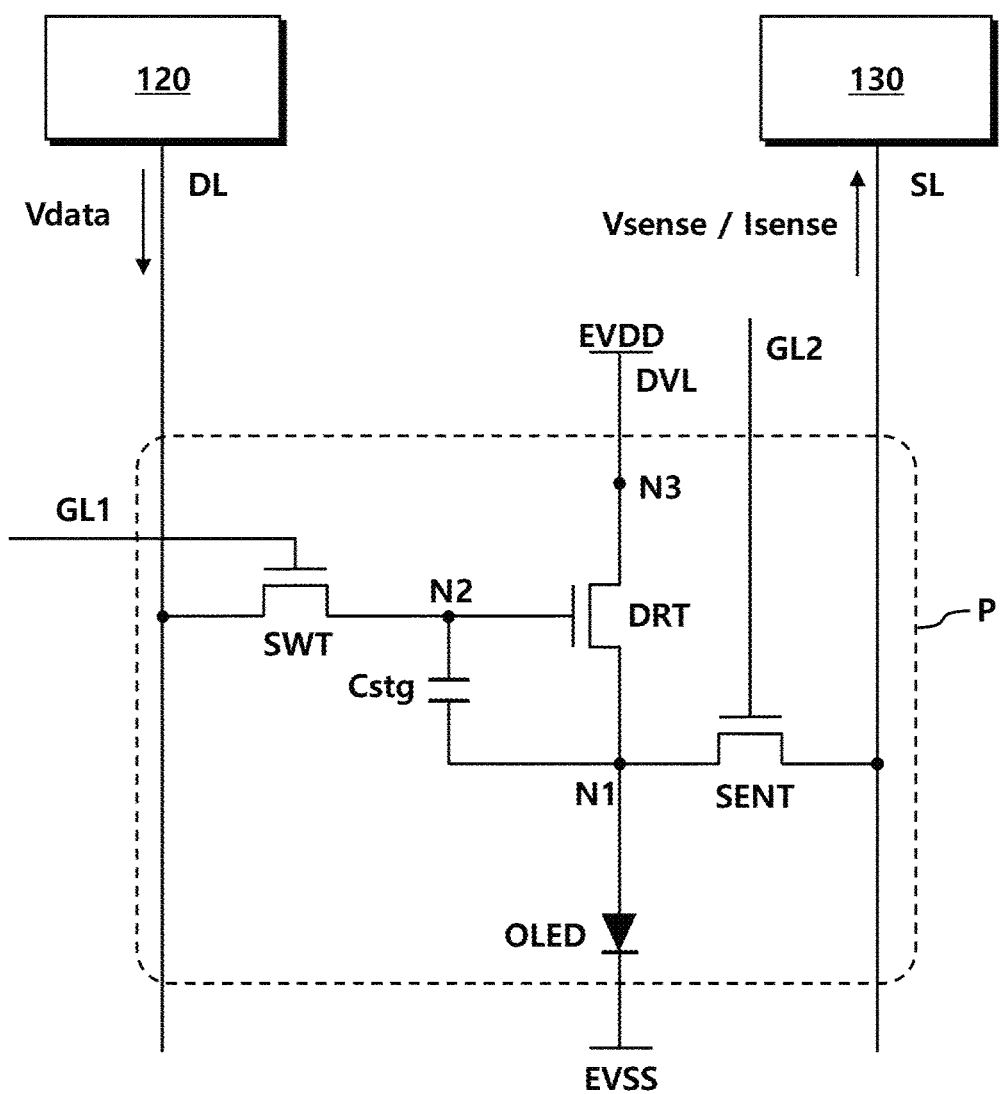
FIG. 2 is a diagram illustrating a structure of a pixel, and signals input/output to/from the pixel from a data driving circuit and a pixel sensing circuit according to one embodiment.

FIG. 2 is a diagram illustrating a structure of the pixel and signals input/output to/from the pixel from the data driving circuit and the pixel sensing circuit according to one embodiment.

Referring to FIG. 2, the pixel P may include an organic light emitting diode OLED, a driving transistor DRT, a switching transistor SWT, a sensing transistor SENT, and a storage capacitor Cstg.

The organic light emitting diode OLED may include an anode electrode, an organic layer, and a cathode electrode. Under the control of the driving transistor DRT, the anode electrode and the cathode electrode are respectively connected to the driving voltage EVDD and the base voltage EVSS to emit light.

The driving transistor DRT may control the brightness of the organic light emitting diode OLED by controlling the driving current supplied to the organic light emitting diode OLED.

A first node N1 of the driving transistor DRT may be electrically connected to the anode electrode of the organic light emitting diode OLED, and may be a source node or a drain node. A second node N2 of the driving transistor DRT may be electrically connected to a source node or a drain node of the switching transistor SWT, and may be a gate node. A third node N3 of the driving transistor DRT may be electrically connected to the driving voltage line DVL for supplying the driving voltage EVDD, and may be the drain node or the source node.

The switching transistor SWT is electrically connected between the data line DL and the second node N2 of the driving transistor DRT, and may be turned on by receiving a scan signal through the gate lines GL1 and GL2.

When the switching transistor SWT is turned on, a data voltage Vdata supplied from the data driving circuit 120 through the data line DL is transferred to the second node N2 of the driving transistor DRT.

The storage capacitor Cstg may be electrically connected between the first node N1 and the second node N2 of the driving transistor DRT.

The storage capacitor Cstg may be a parasitic capacitor existing between the first node N1 and the second node N2 of the driving transistor DRT, and may be an external capacitor which is intentionally designed outside the driving transistor DRT.

The sensing transistor SENT connects the first node N1 of the driving transistor DRT and the sensing line SL, and the sensing line SL applies a reference voltage Vref to the first node N1. The analog signal (e.g., voltage or current) formed in the first node N1 may be transmitted to the pixel sensing circuit 130.

In addition, the pixel sensing circuit 130 measures the characteristics of the pixel P using the analog signal (Vsense or Isense) transmitted through the sensing line SL.

Based on the measured voltage of the first node N1, the threshold voltage, mobility, and current characteristics of the driving transistor DRT can be grasped. In addition, based on the measured voltage of the first node N1, the degree of deterioration of the organic light emitting diode OLED such as parasitic capacitance and current characteristics of the organic light emitting diode OLED can be grasped.

Further, by measuring the current transmitted to the first node N1 through the driving transistor DRT, the current capability of the driving transistor DRT can be measured. In addition, by measuring the current flowing to the organic light emitting diode OLED through the first node N1, the current characteristic of the organic light emitting diode OLED can be measured.

The pixel sensing circuit 130 may measure the current transmitted from or to the first node N1, and transmit the measured value to the data processing circuit 150 in FIG. 1. In addition, the data processing circuit 150 in FIG. 1 may analyze the current to determine the characteristics of each pixel P.

Figure 3:
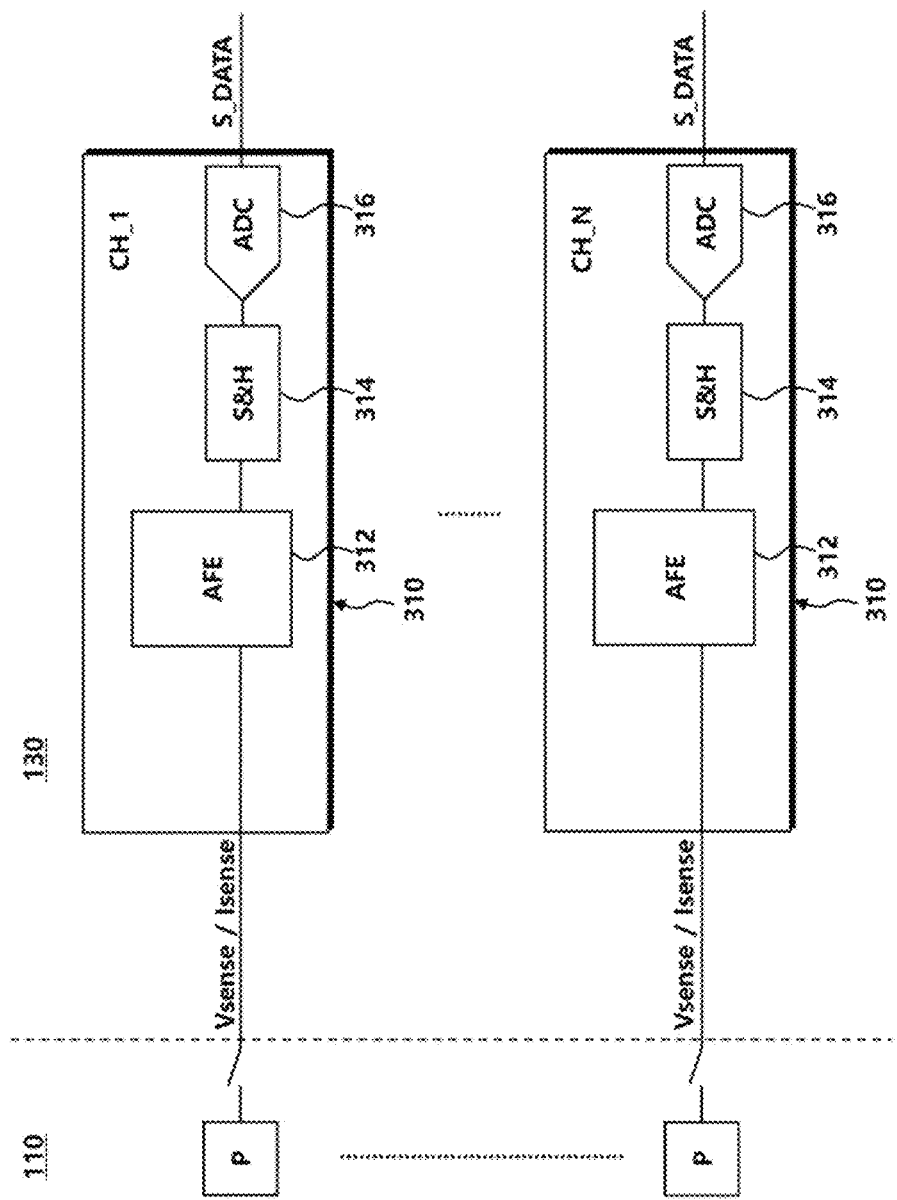
FIG. 3 is a block diagram of the pixel sensing circuit according to one embodiment.

FIG. 3 is a block diagram of the pixel sensing circuit according to one embodiment.

Referring to FIG. 3, the pixel sensing circuit 130 may sense the pixel voltage Vsense or the pixel current Isense transmitted from the pixel P through an analog-to-digital converting circuit 316. In addition, the pixel sensing circuit 130 may transmit the sensing data S_DATA corresponding to the sensed pixel current to the data processing circuit.

The pixel sensing circuit 130 may include a plurality of channel circuits 310, and each channel circuit 310 may include an analog front end (AFE) circuit 312, a sample and hold (S&H) circuit 314, and an analog-to-digital converting circuit (ADC) 316. In FIG. 3, the plurality of channel circuits 310 may be represented by CH 1, ..., CH N.

The analog front end circuit 312 may pre-process the analog signal (e.g., voltage or current) transferred to the input terminal. The analog signal may include a pixel voltage Vsense or a pixel current Isense.

The sample and hold circuit 314 may hold an output signal of the analog front end circuit 312 for a predetermined time. The sample and hold circuit 314 may output the held output signal to the analog-to-digital converting circuit 316 after the predetermined time has elapsed.

The analog-to-digital converting circuit 316 may convert the output signal of the sample and hold circuit 314 into digital data.

Figure 4:
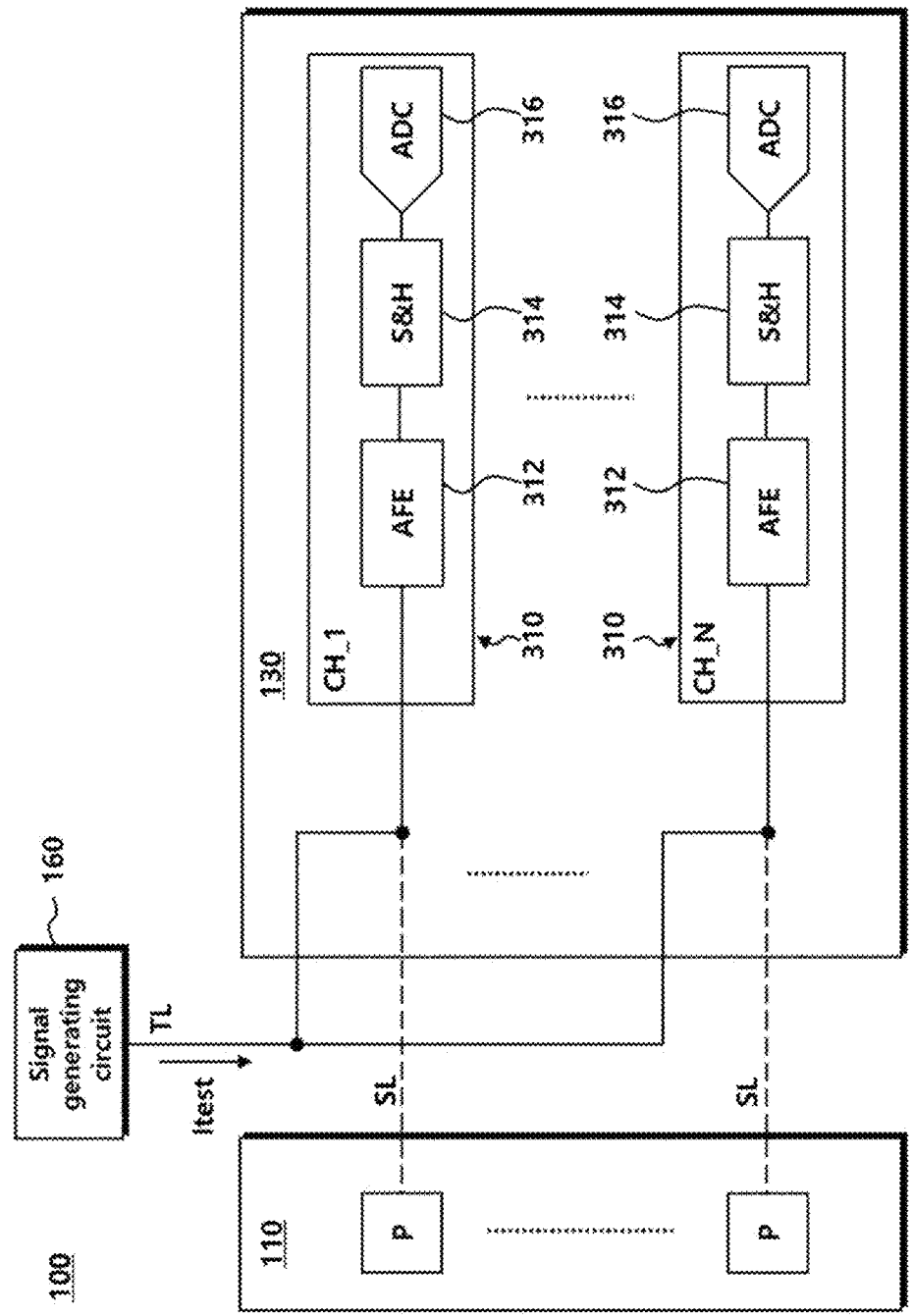
FIG. 4 is a diagram illustrating a test current supplied to the pixel sensing circuit according to one embodiment.

FIG. 4 is a diagram illustrating a test current supplied to the pixel sensing circuit according to one embodiment.

Referring to FIG. 4, in order to test whether each channel circuit properly performs pixel sensing, the pixel sensing circuit 130 may receive a test current Itest. The display device 100 may include a signal generating circuit 160 to supply the test current Itest.

The signal generating circuit 160 may generate the test current Itest for testing the pixel sensing circuit 130 and supply it to the pixel sensing circuit 130. The signal generating circuit 160 may supply the test current Itest to each of the plurality of channel circuits 310 included in the pixel sensing circuit 130. The test current Itest may be input to the analog front end circuit 312, and may be converted into test data by the analog-to-digital converting circuit 316 to be output. The test data may be transmitted to the data processing circuit 150 in FIG. 1. The data processing circuit 150 in FIG. 1 may determine whether the corresponding channel circuit 310 operates properly based on the test data.

The signal generating circuit 160 may be a power management circuit such as a PMIC (Power Management Integrated Circuit). The signal generating circuit 160 may supply power to an internal module of the display device 100, and generate and supply a direct current of a specific value for the pixel sensing test as the test current Itest.

The test current Itest may be supplied to the channel circuit 310 of the pixel sensing circuit 130 through a test line TL and a sensing line SL. The channel circuit 310 may be connected to a corresponding pixel P and the sensing line SL. The test line TL may be connected to the sensing line SL to configure a node. The channel circuit 310 may be tested by receiving the test current Itest through the test line TL and the sensing line SL during the test process. The channel circuit 310 may output test data as a test result.

Meanwhile, the channel circuit 310 may sense the characteristics of the pixel by receiving an analog signal through the sensing line SL in the pixel sensing process. The channel circuit 310 may output sensing data as a result of pixel sensing.

In the test process, the connection to the signal generating circuit 160 through the sensing line SL may be activated, and the connection to the pixel P through the sensing line SL may be deactivated. In FIG. 4, the connection to the inactive pixel P may be indicated by the dotted line.

In the pixel sensing process, the connection to the pixel P through the sensing line SL may be activated, and the connection to the signal generating circuit 160 through the sensing line SL may be deactivated.

Figure 5:
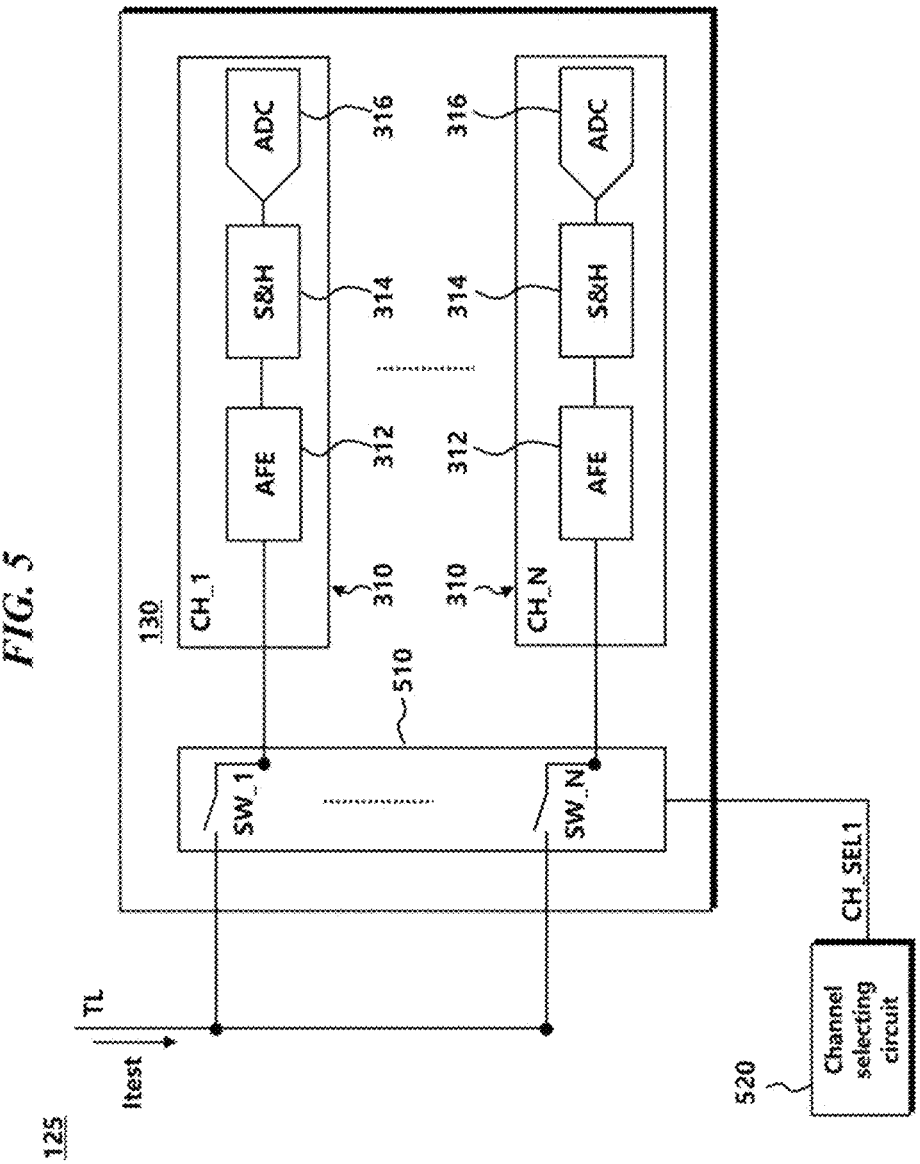
FIG. 5 shows a first example of selecting a channel included in the pixel sensing circuit according to one embodiment.

FIG. 5 shows a first example of selecting a channel included in the pixel sensing circuit according to one embodiment.

Referring to FIG. 5, some of the plurality of channel circuits 310 may be selected for testing the pixel sensing circuit 130, and only the selected channel circuit 310 may be tested. The channel circuit 310 may be selected by controlling supplying of the test current Itest.

The pixel sensing circuit 130 may include a switching circuit 510 to control the supplying of the test current Itest. In addition, the integrated circuit 125 including the pixel sensing circuit 130 may further include a channel selecting circuit 520.

The switching circuit 510 may transmit or block the test current Itest input to each of the plurality of channel circuits 310 from the pixel sensing circuit 130. When the switching circuit 510 is short-circuited, the test current Itest may be input to the analog front end circuit 312 of the channel circuit 310. When the switching circuit 510 is opened, the test current Itest may not be input to the analog front end circuit 312 of the channel circuit 310 and the channel circuit 310 may not be tested. The switching circuit 510 may be short-circuited or opened by a first channel selection signal CH_SEL1 transmitted from the channel selecting circuit 520.

The switching circuit 510 may include a plurality of switches SW_1, ..., SW_N respectively connected to the channel circuits 310. When the switches SW_1, ..., SW_N control the supplying of the test current Itest, some of the channel circuits 310 may be selected for testing. According to the first channel selection signal CH_SEL1, some of the switches SW_1, ..., SW_N may be short-circuited and the others may be opened. The switches SW_1, ..., SW_N may block or pass the test current Itest flowing to each channel circuit 310. The channel circuit 310 receiving the test current Itest may be tested and may output test data as a result thereof. The test data may be transmitted to the data processing circuit 150 in FIG. 1.

The channel selecting circuit 520 may generate a signal for selecting the channel circuit 310 to be tested and supply it to the switching circuit 510. The channel selecting circuit 520 may generate the first channel select signal CH_SEL1 that short-circuits or opens the switching circuit 510 and transmit it to the switching circuit 510.

Figure 6:
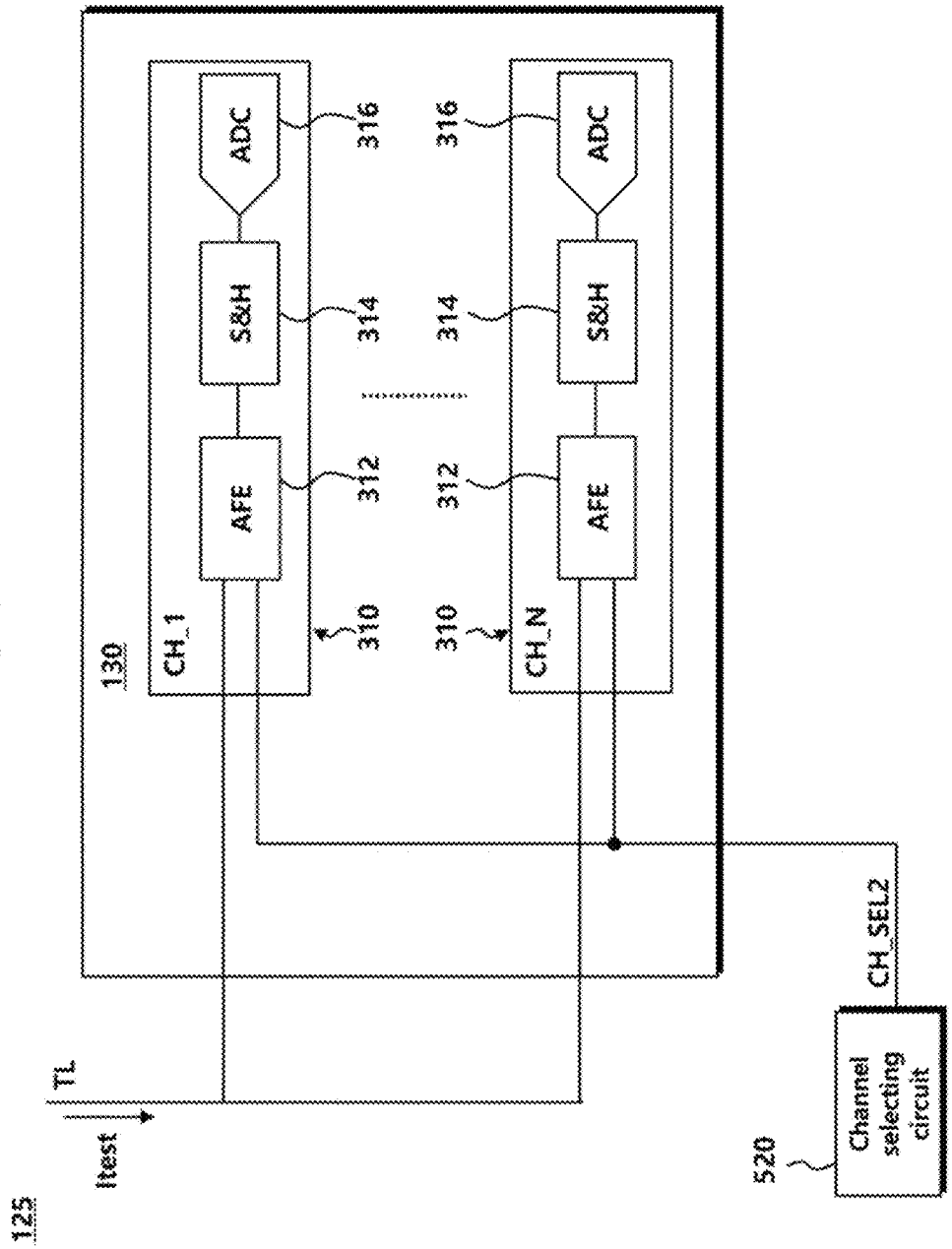
FIG. 6 shows a second example of selecting a channel included in the pixel sensing circuit according to one embodiment.

FIG. 6 shows a second example of selecting a channel circuit included in the pixel sensing circuit according to one embodiment.

Referring to FIG. 6, some of the plurality of channel circuits 310 may be selected for testing the pixel sensing circuit 130, and only the selected channel circuit 310 may be tested. The channel circuit 310 may be selected by driving the analog front end circuit 312.

In order to control the driving of the analog front end circuit 312, the channel selecting circuit 520 may generate a second channel select signal CH_SEL2 and transmit it to the plurality of channel circuits 310.

The second channel selection signal CH_SEL2 may control the driving of the analog front end circuit 312. Specifically, when the analog front end circuit 312 receives the second channel selection signal CH_SEL2, the amplifier included in the analog front end circuit 312 may be turned on or off according to the second channel selection signal CH_SEL2.

Some of the channel circuits 310 may be selected and tested through the driving control of the analog front end circuit 312 by the second channel selection signal CH_SEL2. For example, when the amplifier of the analog front end circuit 312 is turned on while the test current Itest is input to the channel circuit 310, the channel circuit 310 may be tested. If the amplifier of the analog front end circuit 312 is turned off while the test current Itest is input to the channel circuit 310, the channel circuit 310 may not be tested.

The channel selecting circuit 520 may generate a signal for selecting the channel circuit 310 to be tested and supply it to the analog front end circuit 312 of the channel circuit 310. The channel selecting circuit 520 may generate the second channel select signal CH_SEL2 for turning on or off the amplifier of the analog front end circuit 312 and transmit it to the channel circuit 310.

In this figure, any one of the control of the test current Itest and the control of the amplifier driving is used to select the channel circuit 310, but the present disclosure is not limited thereto, and both methods may be used. Accordingly, the channel selecting circuit 520 generates the first channel select signal CH_SEL1 and the second channel select signal CH_SEL2, the supplying of the test current Itest may be controlled by the first channel select signal CH_SEL1, and the driving of the amplifier of the analog front end circuit 312 may be controlled by the second channel selection signal CH_SEL2.

Figure 7:
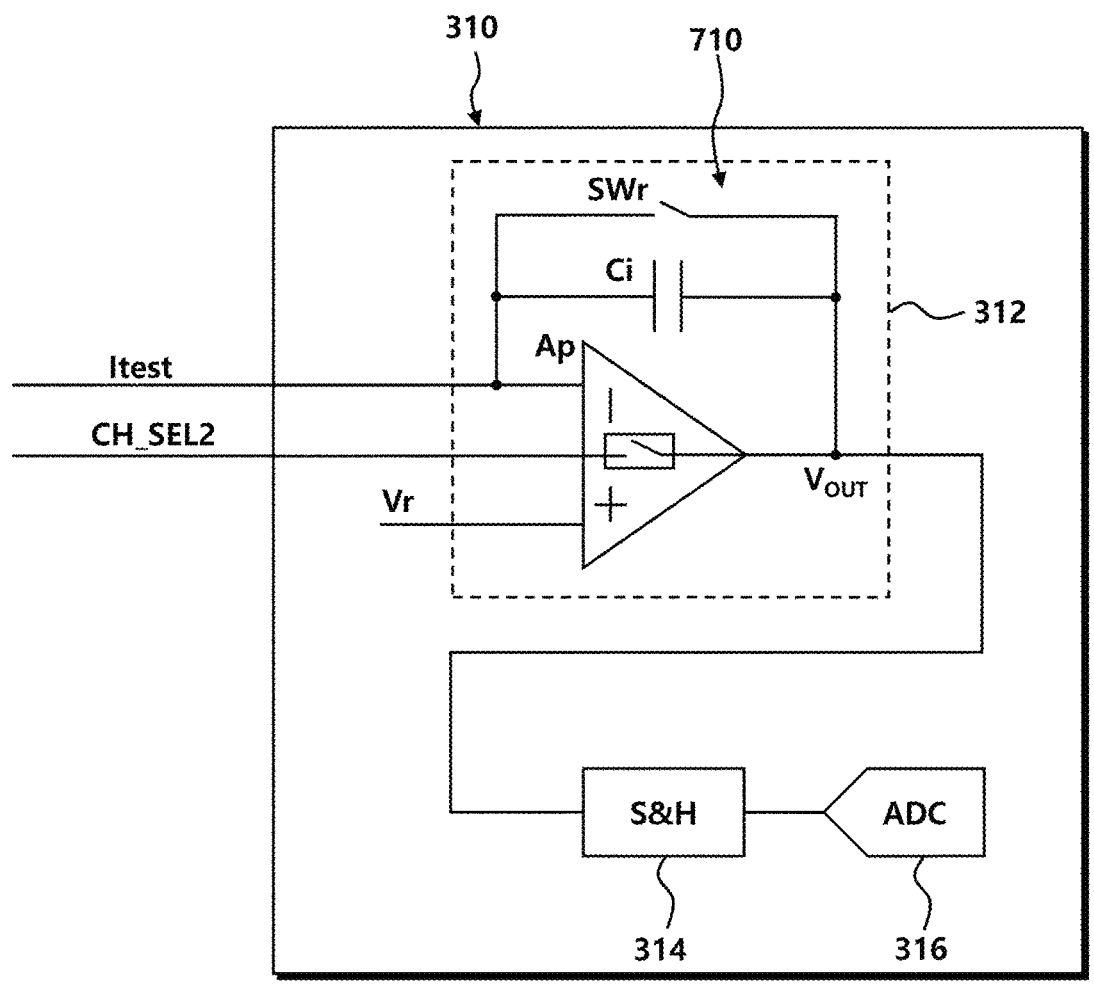
FIG. 7 is a diagram illustrating a signal for driving an amplifier according to the second example of one embodiment.

FIG. 7 is a diagram illustrating a signal for driving the amplifier according to the second example of one embodiment.

Referring to FIG. 7, when the channel circuit 310 is selected through the driving control of the amplifier Ap of the analog front end circuit 312, the second channel selection signal CH_SEL2 and the test current Itest input to the amplifier Ap are shown.

The analog front end circuit 312 includes an integrator 710 and the amplifier Ap may be included in the integrator 710.

The integrator 710 may include the amplifier Ap, a capacitor Ci connected between one input terminal (e.g., a negative input terminal) and an output terminal of the amplifier Ap, a reset switch SWr connected in parallel with the capacitor Ci, and the like. A reference voltage Vr may be applied to a positive input terminal of the amplifier Ap.

The integrator 710 may integrate the test current Itest through the capacitor Ci. The value integrated by the capacitor Ci may be previously reset by the reset switch SWr before the next integration is performed. The integrated value may be converted into test data and output through the sample and hold circuit 314 and the analog-to-digital converting circuit 316.

When some channel circuits 310 are selected for testing, the amplifier Ap of each of the selected channel circuits 310 may receive the test current Itest and the second channel selection signal CH_SEL2.

The second channel selection signal CH_SEL2 may turn on the turned-off amplifier Ap. When the amplifier Ap is turned on, the channel circuit 310 to which the turned-on amplifier Ap belongs is selected, and the integrator 710 may integrate the current entering the negative terminal. Alternatively, the second channel selection signal CH_SEL2 may turn off the turned-on amplifier Ap. When the amplifier Ap is turned off, the channel circuit 310 to which the turned-off amplifier Ap belongs is not selected and the integrator 710 stops operating.

The test current Itest may be integrated by the capacitor Ci. When the amplifier Ap is turned on by the second channel selection signal CH_SEL2, the test current Itest flows into the capacitor Ci, and the channel circuit 310 may be tested.

Figure 8:
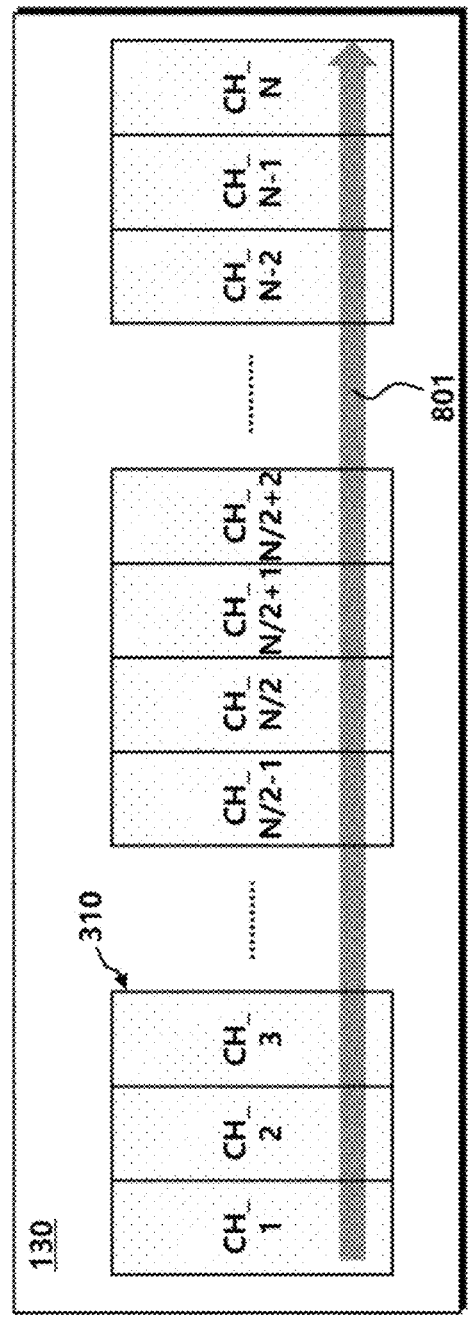
FIG. 8 is a diagram showing a test method of a conventional pixel sensing circuit.

FIG. 8 is a diagram illustrating a test method of a conventional pixel sensing circuit.

Referring to FIG. 8, the conventional test for the pixel sensing circuit 130 may be sequentially performed for all channel circuits 310.

For example, in the case where the pixel sensing circuit 130 includes N number of channel circuits 310, the first channel circuit CH_1 to the N-th channel circuit CH_N are sequentially tested. The order in which the channel circuits 310 are sequentially tested may be the same as the direction of the arrow 801.

Further, even when test data for any one of the channel circuits 310 of the first channel circuit CH_1 to the N-th channel circuit CH_N is needed, the test data for the specific channel circuit 310 could be obtained only after all of the first channel circuit CH_1 to the N-th channel circuit CH_N are tested.

Figure 9:
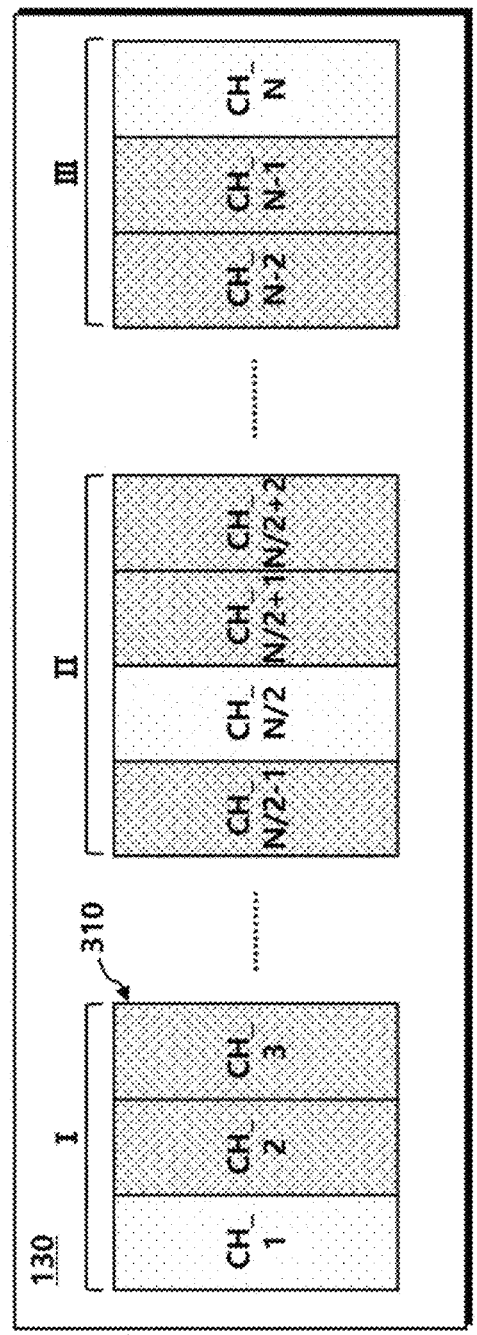
FIG. 9 is a diagram illustrating a test method of the pixel sensing circuit according to one embodiment.

FIG. 9 is a diagram illustrating a test method of the pixel sensing circuit according to one embodiment.

Referring to FIG. 9, the test for the pixel sensing circuit 130 may be selectively performed for some channel circuits 310.

For example, in the case where the pixel sensing circuit 130 includes N number of channel circuits 310, only the first channel circuit CH_1, the N/2-th channel circuit CH_N/2, and the N-th channel circuit CH_N may be selected and tested. Hereinafter, unselected channel circuits 310 are shown in shades in FIG. 9.

Some of the channel circuits 310 to be tested may be selected from a specific group. All the channel circuits 310 may be divided into a plurality of groups, and one or more channel circuits 310 may be selected and tested in each group.

For example, among 300 channel circuits 310 in total, the first to third groups I, II and III may each consist of 100 channel circuits 310. The first group I may include the first to third channel circuits CH_1, CH_2, and CH_3, and the second group II may include the (N/2−1)-th to (N/2+2)-th channel circuits CH_N/2−1, CH_N/2, CH_N/2+1 and CH_N/2+2, and the third group III may include the (N−2)-th to N-th channel circuits CH_N−2, CH_N−1 and CH_N. Here, the channel selecting circuit 520 in FIG. 5 or 6 may select the first channel circuit CH_1 from the first group I, the N/2-th channel circuit CH_N/2 from the second group II, and the N-th channel circuit CH_N from the third group III through the first and second channel selection signals CH_SEL1 and CH_SEL2.

When a specific channel circuit 310 is selected from each group and tested, the same effect as that of testing the entire channel circuits 310 may appear.

The pixel sensing circuit 130 may include parts such as wiring for transmitting and receiving signals around the channel circuits 310. The channel circuits 310 are divided into a plurality of groups according to the arrangement and design of the parts. The channel circuits 310 of each group may be affected by electromagnetic waves or delays caused by peripherals. Therefore, the channel circuits included in one group, for example, the first to third channel circuits CH_1, CH_2, and CH_3 of the first group I, may share certain electrical characteristics.

Further, the pixel sensing circuit 130 may be manufactured by a certain process sequence, and the channel circuits included in one group, for example, the first to third channel circuits CH_1, CH_2 and CH_3 of the first group I, may share certain process characteristics.

Since the channel circuits 310 included in each group share characteristics, selectively testing some of the channel circuits 310 in one group may be the same as testing all the channel circuits 310 in the corresponding group. Furthermore, the selective testing for all groups may be the same as testing the entire pixel sensing circuit 130. That is, the selected channel circuits 310 may represent all the channel circuits 310 of the pixel sensing circuit 130. Therefore, it can be determined whether the pixel sensing circuit 130 can properly sense the pixel characteristics through testing of some of the channel circuits 310. When the channel circuit 310 transmits the test data generated as a result of the test to the timing controller 150 in FIG. 1, the timing controller 150 in FIG. 1 can determine whether the sensing of the pixel sensing circuit 130 is performed appropriately based on the test data.

In addition, the plurality of channel circuits 310 may be arranged in a plurality of regions in the pixel sensing circuit 130. The arrangement of the channel circuits 310 may vary depending on the design. For example, the first to third channel circuits CH_1, CH_2 and CH_3 of the first group I may be disposed in the first region. The (N−2)-th to N-th channel circuits CH_N−2, CH_N−1 and CH_N of the third group III may be disposed in a second region different from the first region. The first region and the second region may be adjacent to each other or may be spaced apart from each other by a predetermined distance or more.

The arrangement of the plurality of channel circuits 310 for regions may affect characteristics shared by each group. If the regions are different, it is likely that the electrical and/or process characteristics as described above may also be different.

Figure 10:
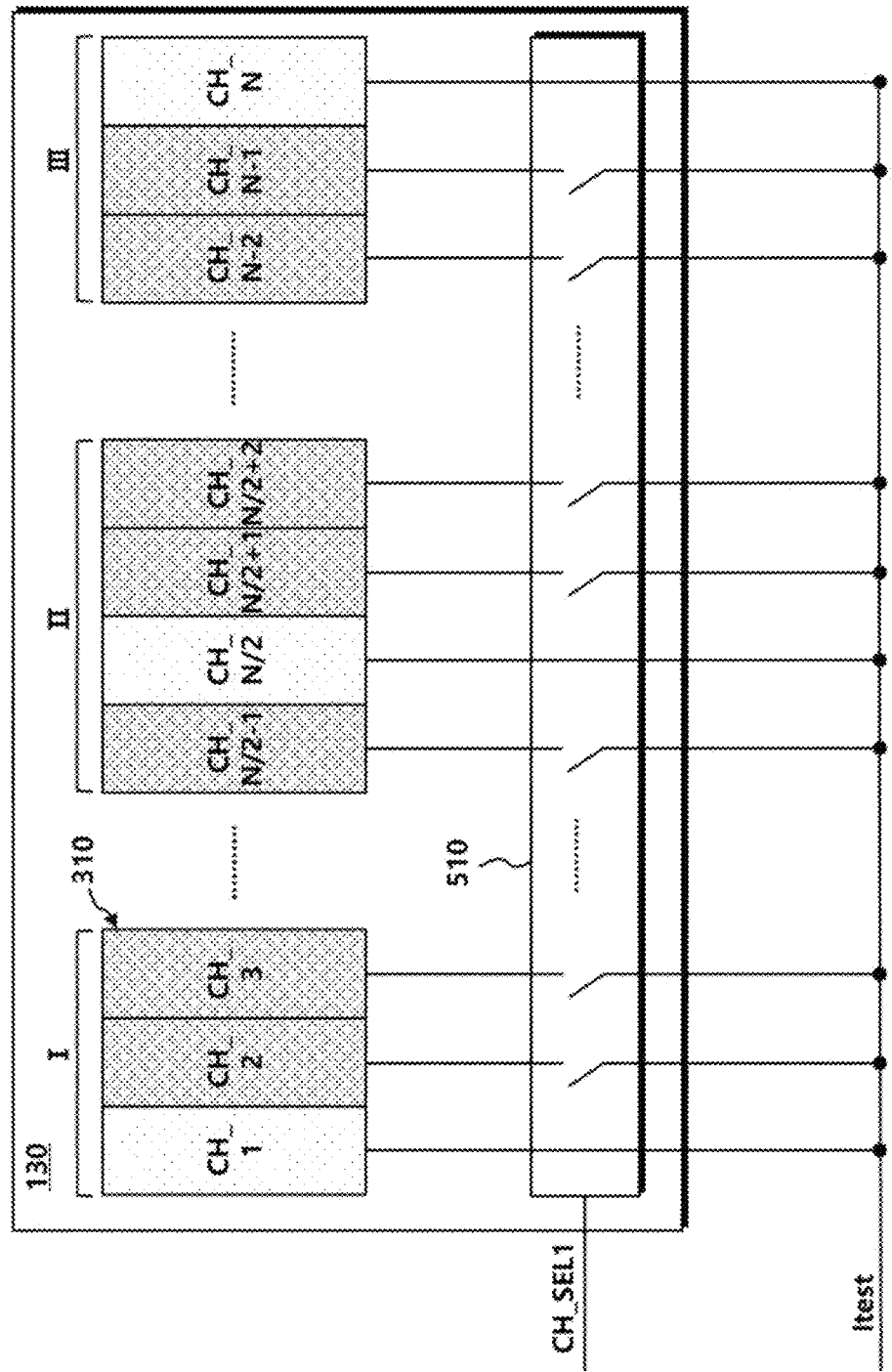
FIG. 10 is a diagram showing that the pixel sensing circuit according to one embodiment is tested according to the first example.

FIG. 10 is a diagram showing that the pixel sensing circuit according to one embodiment is tested according to the first example.

Referring to FIG. 10, for the testing of the pixel sensing circuit 130, several channel circuits 310 may be selected through the control of supplying of the test current Itest.

The test current Itest may be generated by the signal generating circuit 160 in FIG. 4 and supplied to the pixel sensing circuit 130.

The first channel selection signal CH_SEL1 may be generated by the channel selecting circuit 520 in FIG. 5 and transmitted to the switching circuit 510. The switching circuit 510 may open or close the internal switch according to the first channel selection signal CH_SEL1. The test current Itest may be supplied to the channel circuit in which the switch is opened, for example, the first channel circuit CH_1. On the other hand, the test current Itest is not supplied to the channel circuit in which the switch is short-circuited, for example, the second channel circuit CH_2.

Figure 11:
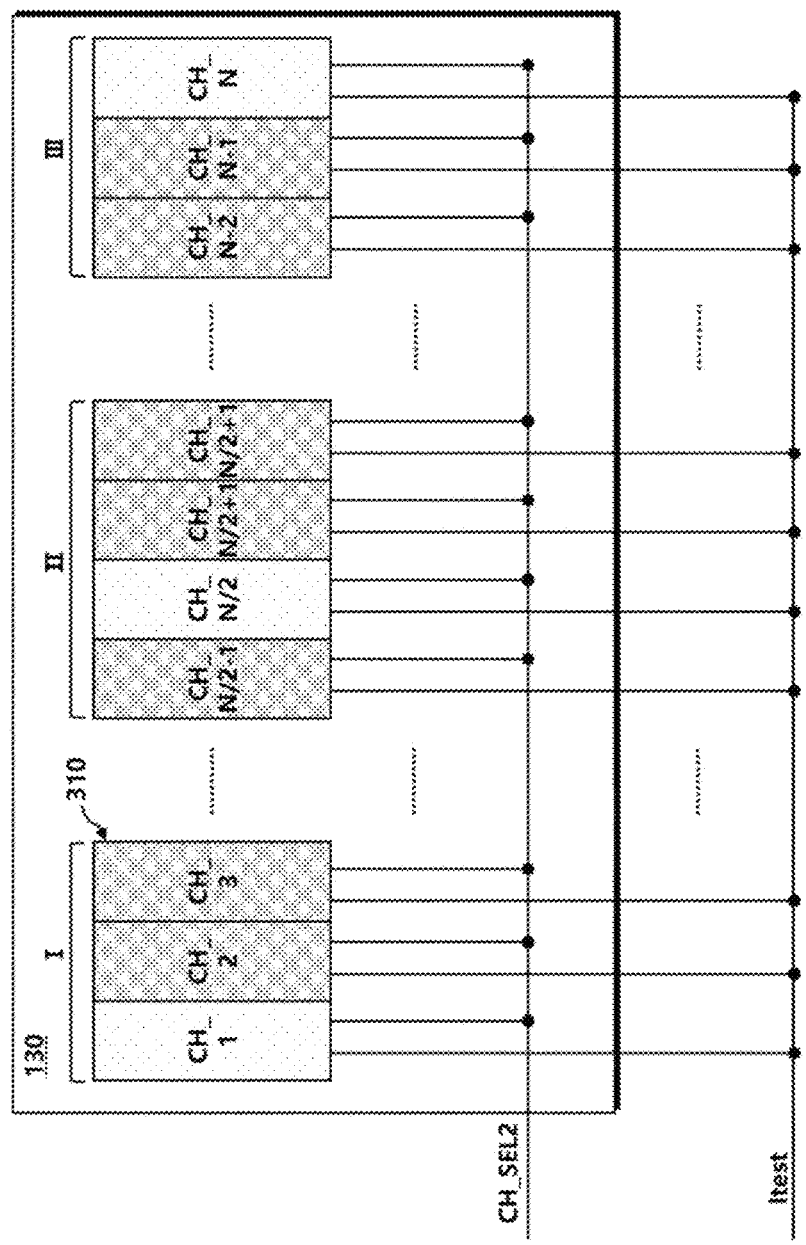
FIG. 11 is a diagram showing that the pixel sensing circuit according to one embodiment is tested according to the second example.

FIG. 11 is a diagram showing that the pixel sensing circuit according to one embodiment is tested according to the second example.

Referring to FIG. 11, several channel circuits 310 may be selected through amplifier driving for testing the pixel sensing circuit 130.

The test current Itest may be generated from the signal generating circuit 160 in FIG. 4 and supplied to each channel circuit 310 of the pixel sensing circuit 130.

The second channel selection signal CH_SEL2 may be generated by the channel selecting circuit 520 in FIG. 5 and transmitted to the analog front end circuit 312 in FIG. 3 of the channel circuit 310. The analog front end circuit 312 in FIG. 3 may turn on or off the internal amplifier Ap in FIG. 7 according to the second channel selection signal CH_SEL2. The channel circuit in which the amplifier Ap in FIG. 7 is turned on, for example, the first channel circuit CH_1, may be tested. On the other hand, the channel circuit in which the amplifier Ap in FIG. 7 is turned off, for example, the second channel circuit CH_2, may not be tested.

Figure 12:
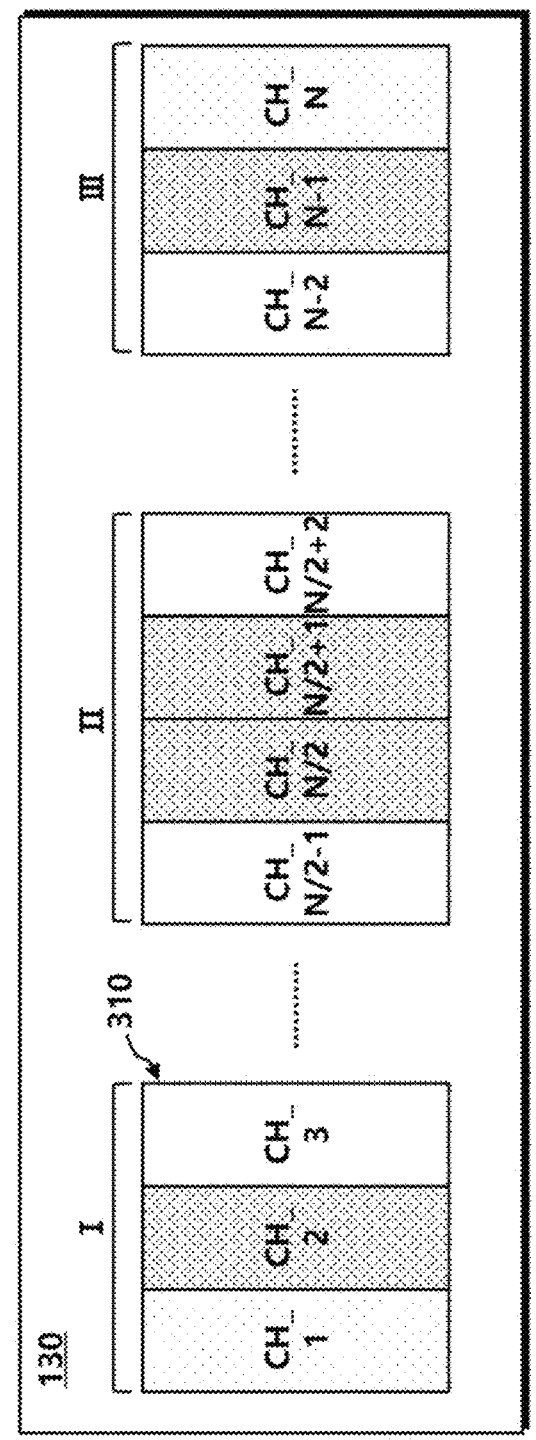
FIG. 12 is a diagram illustrating a test method of the pixel sensing circuit according to another embodiment.

FIG. 12 is a diagram illustrating a test method of the pixel sensing circuit according to another embodiment.

Referring to FIG. 12, for the testing of the pixel sensing circuit 130, the channel circuit 310 located at the edge of each group may be selected. The groups may be spaced apart from each other. This design feature may be caused by wiring inside the pixel sensing circuit 130, but is not limited thereto. When the groups are positioned with wiring interposed therebetween, testing the channel circuit 310 located at the edge of each group may be easier in design than testing the channel circuit located at the midpoint of the group.

For example, in the first group I, the first and third channel circuits CH_1 and CH_3 may be selected, and in the second group II, the (N/2−1)-th and (N/2+2)-th channel circuits CH_N/2−1 and CH_N/2+2 may be selected, and in the third group III, the (N−2)-th and N-th channel circuits CH_N−2 and CH_N may be selected.

Meanwhile, the above-described test may be to test the normal operation of the channel circuit, or may be a test for correction of the channel circuit. The characteristic values of the channel circuits may be different from each other due to the characteristic difference between the groups, and the pixel sensing circuit may correct the characteristic deviation of each channel circuit through the above-described test. The compensation for the characteristic deviation can be made in the data processing device, which compensates sensing data by determining the compensation parameter value for each channel circuit or each group through a test, and applying the compensation parameter value to the sensing data generated by pixel sensing.

What is claimed is:

1. An integrated circuit comprising:
   a pixel sensing circuit configured to sense characteristics of pixels disposed on a panel through a sensing line, wherein the pixel sensing circuit comprises a plurality of channel circuits to be tested for sensing;
   a channel selecting circuit configured to generate a channel selection signal for selecting at least one representative channel circuit among the plurality of channel circuits; and
   a signal generating circuit configured to supply a test current to a selected representative channel circuit through the sensing line, wherein, in a test process of the selected representative channel circuit, a connection of the selected representative channel circuit to the signal generating circuit through the corresponding sensing line is activated, and a connection of the selected representative channel circuit to the corresponding pixel through the corresponding sensing line is deactivated, and wherein, in a pixel sensing process of the pixel, the connection of the selected representative channel circuit to the corresponding pixel through the corresponding sensing line is activated, and the connection of the selected representative channel circuit to the signal generating circuit through the corresponding sensing line is deactivated, wherein the sensing line is not connected to remaining channel circuits when the sensing line is connected to the representative channel circuit.

2. The integrated circuit of claim 1, wherein the representative channel circuit receives an analog signal including a test current, converts the test current through the test, and outputs a digital signal including test data.

3. The integrated circuit of claim 2, wherein the representative channel circuit integrates the test current to generate an integrated voltage and converts the integrated voltage to generate the test data.

4. The integrated circuit of claim 1, wherein the pixel sensing circuit comprises a switching circuit that controls the supply of the test current, and the switching circuit transmits the test current to the representative channel circuit and blocks the test current to the remaining channel circuits.

5. The integrated circuit of claim 4, wherein the switching circuit comprises a plurality of switches respectively connected to the plurality of channel circuits, and the plurality of switches controls the supply of the test current to the respective channel circuits through opening and closing.

6. The integrated circuit of claim 5, wherein the channel selecting circuit transmits the channel selection signal to the switching circuit to open or close each of the plurality of switches.

7. The integrated circuit of claim 1, wherein each of the plurality of channel circuits comprises an amplifier, and the channel selecting circuit controls driving of an amplifier to select a representative channel circuit, wherein the channel selecting circuit turns on an amplifier of a channel circuit in order to select the channel circuit as a representative channel circuit and turns off an amplifier of a channel circuit so as not to select the channel circuit.

8. The integrated circuit of claim 7, wherein the channel circuit receives the channel selection signal and controls driving of the amplifier according to the channel selection signal.

9. An integrated circuit comprising:
a pixel sensing circuit configured to sense characteristics of pixels disposed on a panel, wherein the pixel sensing circuit comprises a plurality of channel circuits to be tested for a sensing; and
a channel selecting circuit configured to generate a channel selection signal for selecting at least one representative channel circuit among the plurality of channel circuits,
wherein the representative channel circuit is a channel circuit located at an edge among the plurality of channel circuits disposed in the pixel sensing circuit.

10. The integrated circuit of claim 1, wherein the test current is generated by a Power Management Integrated Circuit (PMIC) and supplied to the pixel sensing circuit.

11. A pixel sensing circuit for sensing a characteristic of a pixel disposed on a panel, the pixel sensing circuit comprising:
a first group comprising a plurality of first channel circuits having a first characteristic; and
a second group comprising a plurality of second channel circuits having a second characteristic different from the first characteristic,
wherein each of the first and second groups include at least one representative channel circuit selected for a test for a sensing of the pixel characteristic,
wherein the plurality of first channel circuits are arranged adjacent to each other in a first region,
the plurality of second channel circuits are arranged adjacent to each other in a second region spaced apart from the first region,
a first representative channel circuit included in the first group is positioned at an edge of the first region, and
a second representative channel circuit included in the second group is positioned at an edge of the second region.

12. The pixel sensing circuit of claim 11, wherein the representative channel circuit receives a test current and is tested by the test current, and
the remaining channel circuits do not receive the test current and are not tested.

13. The pixel sensing circuit of claim 11, wherein each of the plurality of first channel circuits and the plurality of second channel circuits comprises an amplifier therein, and
the representative channel circuit is tested when its amplifier is turned on and the remaining channel circuits are not tested when their amplifiers are turned off.

* * * * *